(12) United States Patent  (10) Patent No.: US 8,777,070 B2
Moore et al.  (45) Date of Patent: Jul. 15, 2014

(54) SPARE TIRE CARRIER (71) Applicant: JF Products, LP, Rockwood, TN (US)

(72) Inventors: Joseph S. Moore, Rockwood, TN (US); Frank Bruno, Rockwood, TN (US)

(73) Assignee: JF Products, LP, Rockwood, TN (US)

( * ) Notice: Subject to any disclaimer, the term of this patent is extended or adjusted under 35 U.S.C. 154(b) by 0 days.

(21) Appl. No.: 13/804,472

(22) Filed: Mar. 14, 2013

(65) Prior Publication Data

US 2013/0299530 A1  Nov. 14, 2013

Related U.S. Application Data (60) Provisional application No. 61/644,930, filed on May 9, 2012.

(51) Int. Cl.
*B62D 43/02* (2006.01)

(52) U.S. Cl.
USPC .......... 224/42.21; 224/42.13; 224/42.26; 224/534; 224/568; 414/466

(58) Field of Classification Search
USPC ........... 224/42.12–42.3, 534, 455, 460, 568; 296/37.2; 414/463–466; D12/202
See application file for complete search history.

(56) References Cited

U.S. PATENT DOCUMENTS

| | | | | |
|---|---|---|---|---|
| 1,043,752 A | * | 11/1912 | Bolz | 224/42.14 |
| 1,445,913 A | * | 2/1923 | Roos | 296/37.2 |
| 2,377,149 A | * | 5/1945 | Heil | 414/463 |
| 2,991,894 A | * | 7/1961 | Walker | 414/466 |
| 3,442,408 A | * | 5/1969 | Kost et al. | 414/463 |
| 3,779,580 A | * | 12/1973 | Thelen | 280/164.1 |
| 3,822,814 A | * | 7/1974 | Baldi | 224/502 |
| 4,155,472 A | * | 5/1979 | Dansbury | 414/466 |
| 4,171,078 A | * | 10/1979 | Morgan | 224/550 |
| 4,275,981 A | | 6/1981 | Bruhn | |
| 4,561,575 A | * | 12/1985 | Jones | 224/42.21 |
| D293,229 S | | 12/1987 | Smith | |
| 4,813,584 A | * | 3/1989 | Wiley | 224/510 |
| 5,085,360 A | * | 2/1992 | Fortune et al. | 224/42.13 |
| D342,713 S | * | 12/1993 | Vrilakas et al. | D12/202 |
| 5,370,285 A | | 12/1994 | Steelman | |
| 5,449,031 A | * | 9/1995 | Burklund | 157/1 |
| 5,469,998 A | | 11/1995 | Van Dusen et al. | |
| 6,918,520 B2 | | 7/2005 | Skinner | |
| 7,249,927 B2 | * | 7/2007 | Wooten et al. | 414/466 |
| 7,533,789 B1 | | 5/2009 | Seely et al. | |
| 2006/0285953 A1 | * | 12/2006 | Wooten et al. | 414/463 |
| 2009/0120976 A1 | * | 5/2009 | MacKarvich | 224/42.21 |

FOREIGN PATENT DOCUMENTS

| | | | | |
|---|---|---|---|---|
| FR | 2586992 A1 | * | 3/1987 | B62D 43/02 |
| JP | 61075068 A | * | 4/1986 | B62D 43/02 |

* cited by examiner

*Primary Examiner* — Justin Larson
*Assistant Examiner* — Scott McNurlen
(74) *Attorney, Agent, or Firm* — Merchant & Gould (57) ABSTRACT

A spare tire carrier is provided. The spare tire carrier includes a mounting assembly and a support assembly that cooperate to carry a spare tire. The mounting assembly is configured for releaseably connecting the spare tire carrier to a vehicle. The support assembly is configured for supporting the spare tire regardless of whether the spare tire has a rim or is rimless. The spare tire carrier may also include a hinged bracket that allows the spare tire carrier to be placed in a down position to allow the driver to access engine components.

8 Claims, 7 Drawing Sheets

SPARE TIRE CARRIER

CROSS REFERENCE TO RELATED APPLICATIONS

The present application claims priority to U.S. Provisional Application No. 61/644,930 filed May 9, 2012 entitled "Spare Tire Carrier," which is hereby incorporated by reference.

BACKGROUND

Many vehicles are designed with the ability to readily carry a spare tire. For example, some vehicles are manufactured to carry a spare tire in the undercarriage of the vehicle. Other vehicles are designed with tire wells in the trunk to carry a spare tire and to minimize the space occupied by the spare tire.

In other vehicles, like a recreational vehicle ("RV"), the ability to carry a spare tire while minimizing space is not readily available. For example, most Class A type RVs and some Class C type RVs typically do not include a spare tire or a rear bumper to attach some form of tire carrier, thus the only available space to transport a spare tire is in one of the available compartments on the RV. Unfortunately, RV compartment space is limited and some compartments are not large enough to hold a tire. More importantly, the compartment space is often needed to store food, supplies, and other important cargo. Accordingly, the use of a compartment on an RV to carry a spare tire isn't always practical.

BRIEF SUMMARY

A spare tire carrier is described herein and illustrated in the accompanying figures. The spare tire carrier includes a mounting assembly and a support assembly that cooperate to carry a spare tire. The mounting assembly is configured for releaseably connecting the spare tire carrier to a vehicle. The support assembly is configured for supporting the spare tire regardless of whether the spare tire has a rim or is rimless. The spare tire carrier may also include a hinged bracket that allows the spare tire carrier to be placed in a down position to allow the driver to access engine components.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
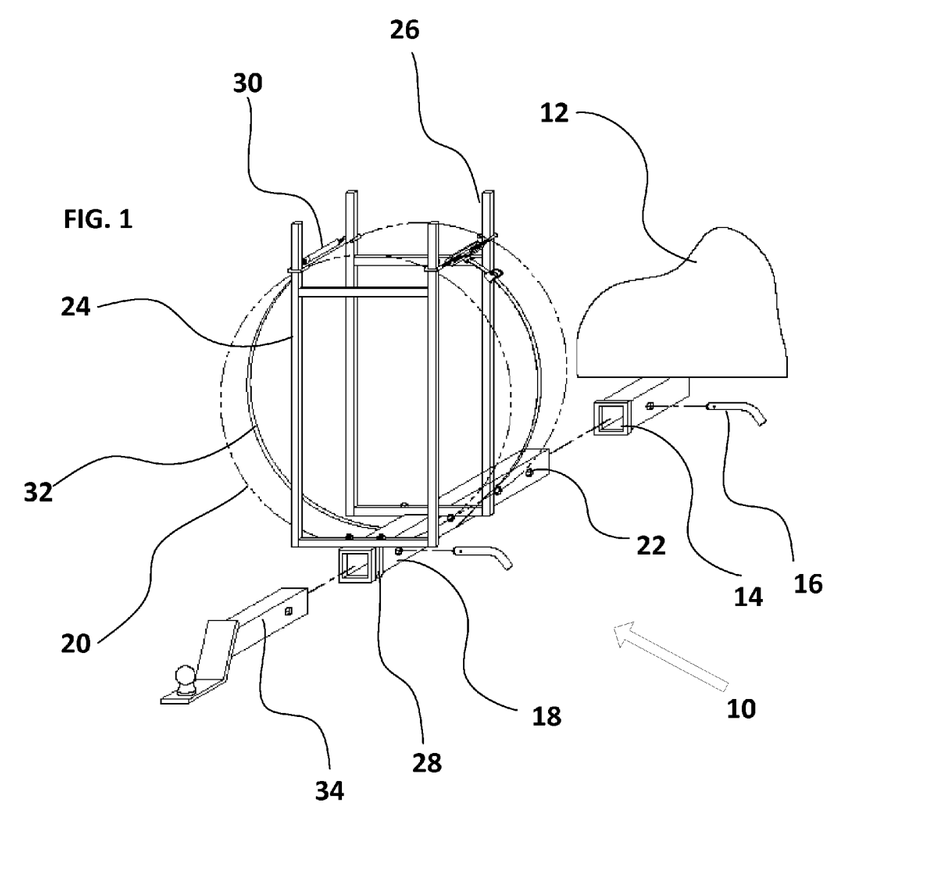
FIG. 1 is an exploded view of one embodiment of the spare tire carrier.

FIG. 1 is an exploded view of one embodiment of the spare tire carrier 10. In the example embodiment, the vehicle 12 has a receiver hitch 14 or a mount for a trailer hitch that is located at the rear of the vehicle. The receiver hitch 14 is commonly used to allow the vehicle to tow trailers, boats, or even other vehicles. In the illustrated embodiment, the receiver hitch is configured with an opening at the distal end to receive a ball hitch or a tow bar used to tow a vehicle behind the RV. Further, upon receipt of the ball hitch, a hitch pin 16 is used to secure the ball hitch to the receiver hitch 14.

The spare tire carrier 10 is configured to be mounted to the receiver hitch 14 of the vehicle 12. In the illustrated embodiment, the spare tire carrier 10 generally comprises a mounting assembly and a support assembly. The mounting assembly includes a square elongated member 18 dimensioned to be received within the opening of the receiver hitch 14. Further, the length of the elongated member 18 is dependent upon the dimensions of the spare tire 20, shown in phantom, and the location of the receiver hitch 14. For example, in one embodiment, the elongated member 18 may be approximately eighteen inches, which provides sufficient space for the spare tire 20. In another example, the elongated member 18 may be approximately twenty-two inches in order to provide sufficient space for the spare tire 20 when secured to a receiver hitch 14, which is recessed in the back of the vehicle 12. Further, the elongated member 18 has two holes 22 extending through the sides of the elongated member 18. In one embodiment, the first hole is located at a first end and configured for a rear hitch pin and the second hole is located at a second end and configured for the ball mount or tow bar. The two holes are dimensioned such that the hitch pin 16 may pass through the elongated member 18.

In the illustrated embodiment, the support assembly of the spare tire carrier 10 provides a front support member 24 and a back support member 26. The front and back support members 24, 26 are configured to provide sufficient space to receive a spare tire 20 for the vehicle 12. The front and back support members 24, 26 are mounted to the mounting assembly. For example, in one embodiment, each support member 24, 26 is mounted to the elongated member 18 by U-bolts 28.

In the illustrated embodiment, the support assembly further includes attachment brackets 30 and a support strap 32. The attachment brackets 30 are secured to the front and back support members near the top portion of the spare tire 20. In the illustrated embodiment, the attachment brackets 30 are releaseably coupled to the front and back support members 24, 26 to allow the attachment brackets 30 to be removed for accessing the spare tire 20. Afterwards, the attachment brackets 30 may be recoupled to the front and back support members 24, 26. The attachment brackets 30 also provide a position to attach the support strap 32.

The support assembly further includes a support strap 32 to provide additional support of the tire 20. Specifically, the support strap 32 extends from a first attachment bracket 30 around the bottom portion of the elongated member 18 to the second attachment bracket 30, thereby securing the spare tire 20 to the spare tire carrier 10.

It should be noted that carrying the spare tire 20 by the support assembly, as described herein, provides the vehicle operator with options for carrying a spare tire 20. For example, the spare tire carrier 10 allows the vehicle 12 to carry a rimless spare tire or a spare tire with a rim. For RVs that have different front and rear rim configurations, it gives the ability to carry a rimless matching spare tire that can be mounted to any rim regardless of the rims configuration. The use of a mismatched tire can greatly affect the handling of the RV.

Further, in the illustrated embodiment, the spare tire carrier 10 includes a receiver hitch at the distal end of the mounting structure to allow for mounting a ball hitch 34 or other type of towing hitch.

Figure 2:
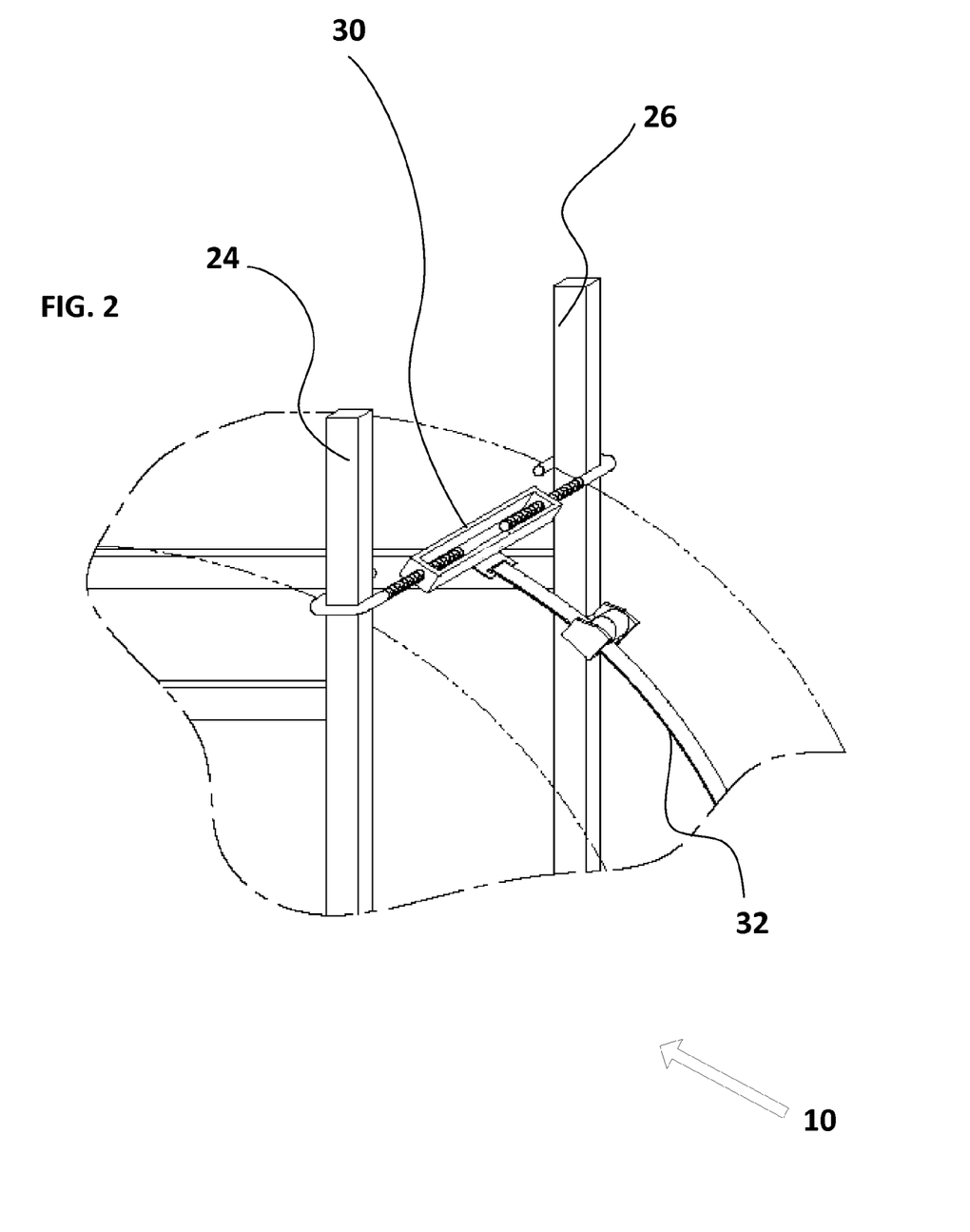
FIG. 2 is an enlarged view of a portion of the spare tire carrier in FIG. 1.

FIG. 2 is an enlarged view of a portion of the spare tire carrier 10 in FIG. 1. More particularly, FIG. 2 shows an example embodiment of the attachment brackets 30 releaseably coupled to the front and back support members 24, 26. One suitable selection for the attachment brackets 30 is a turnbuckle. The turnbuckle includes end portions that are dimensioned to couple with the front and back support members. In an example embodiment, the turnbuckle carriage is approximately six inches and includes end portions that are bent to form square hooks having an internal dimension of one and one sixteenth inches to couple with the support members. Further, the turnbuckle carriage provides a central location for attachment of the support strap 32.

Figure 3:
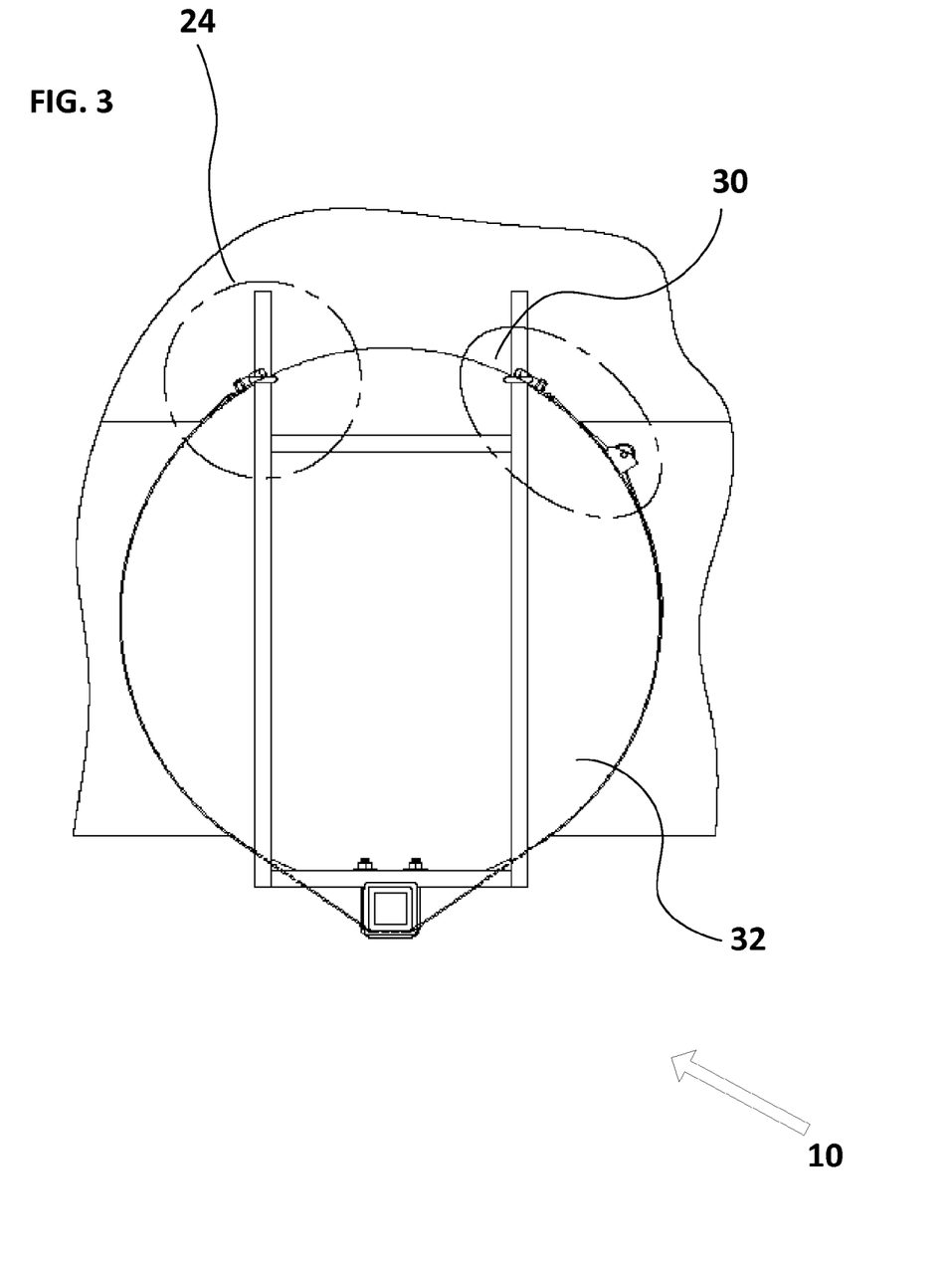
FIG. 3 is a front view of one embodiment of the spare tire carrier.

FIG. 3 is a front view of one embodiment of the spare tire carrier 10. As depicted in the illustrated embodiment, the support strap 32 is attached to each attachment brackets 30 and extends along the lower portion of the spare tire and under the mounting assembly to secure the spare tire to spare tire carrier 10. While the attachment brackets 30 can be securely mounted to the front and back support members 24, 26, the support strap 32 may be used to provide additional means of securing the spare tire.

Figure 4:
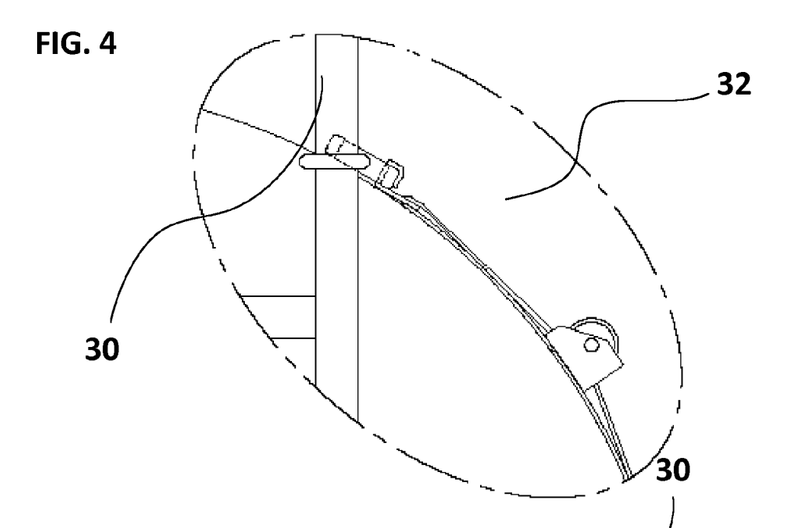
FIG. 4 is an enlarged view of a portion of the spare tire carrier in FIG. 3.
Figure 5:
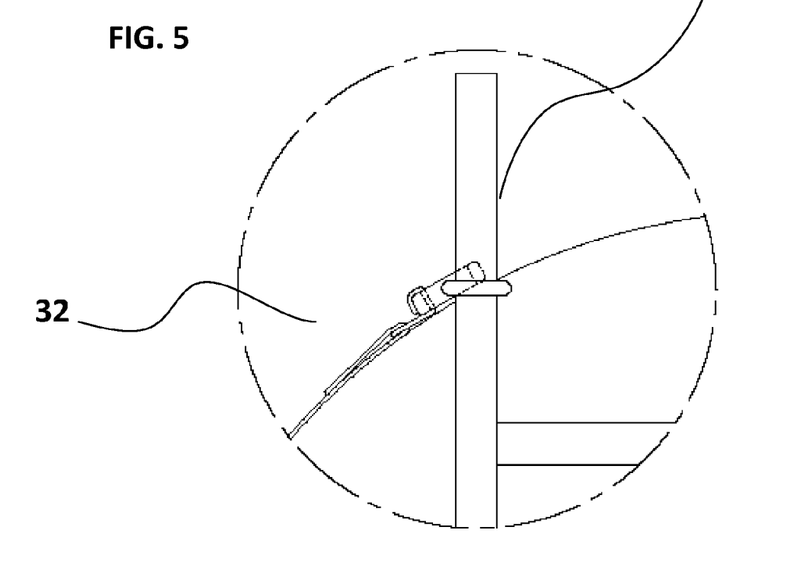
FIG. 5 is an enlarged view of a portion of the spare tire carrier in FIG. 3.

FIG. 4 and FIG. 5 are enlarged views of a portion of the spare tire carrier 10 in FIG. 3. Specifically, FIG. 4 and FIG. 5 depict the attachment of the support strap 32 to the attachment brackets 30. In the illustrated embodiment, the support strap 32 includes a hook for attaching the support strap 32 to the attachment brackets 30. In alternate embodiments, the support strap 32 is otherwise attachable to the attachment brackets 30 such that the support strap 32 is removable for providing access to the spare tire. Further, the support strap 32 also includes a buckle to tighten the support strap 32 around the spare tire.

Figure 6:
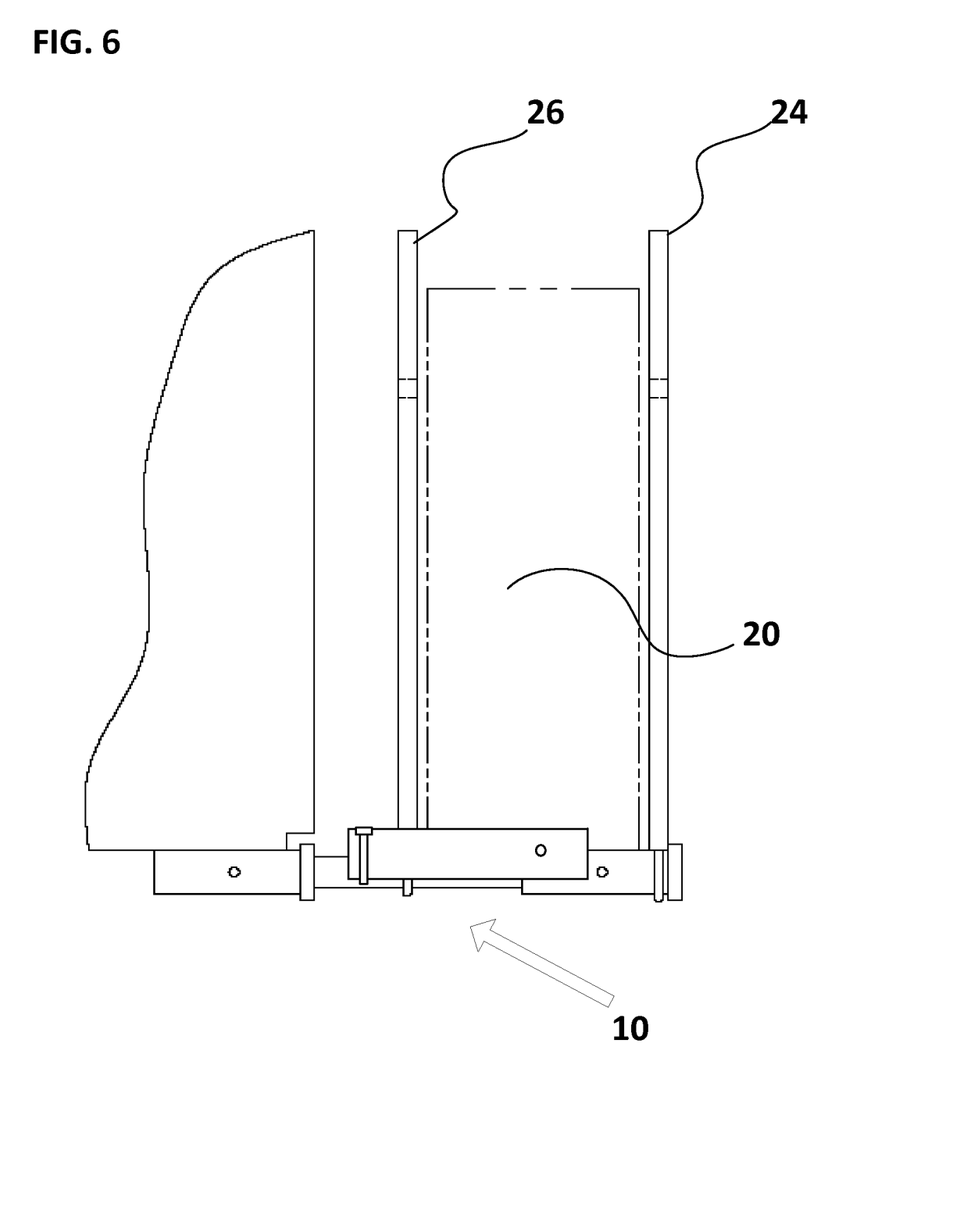
FIG. 6 is a side view of one embodiment of the spare tire carrier.

FIG. 6 is a side view of one embodiment of the spare tire carrier 10. In the example embodiment, the support assembly of the spare tire carrier 10 includes front and back support members 24, 26 fabricated from one inch square tubing. The front and back support members 24, 26 extend to a height of approximately thirty-six inches from the mounting assembly. The distance between the front and back support members 24, 26 is dependent upon the particular spare tire 20. For example, in one embodiment, the spacing is approximately twelve inches to accommodate for the spare tire 20. It should also be recognized that tires of various sizes may be carried by the spare tire carrier 10. In other embodiments, the dimensions of the support assembly may be adjusted along the mounting assembly to accommodate for the particular size of the spare tire 20.

Figure 7:
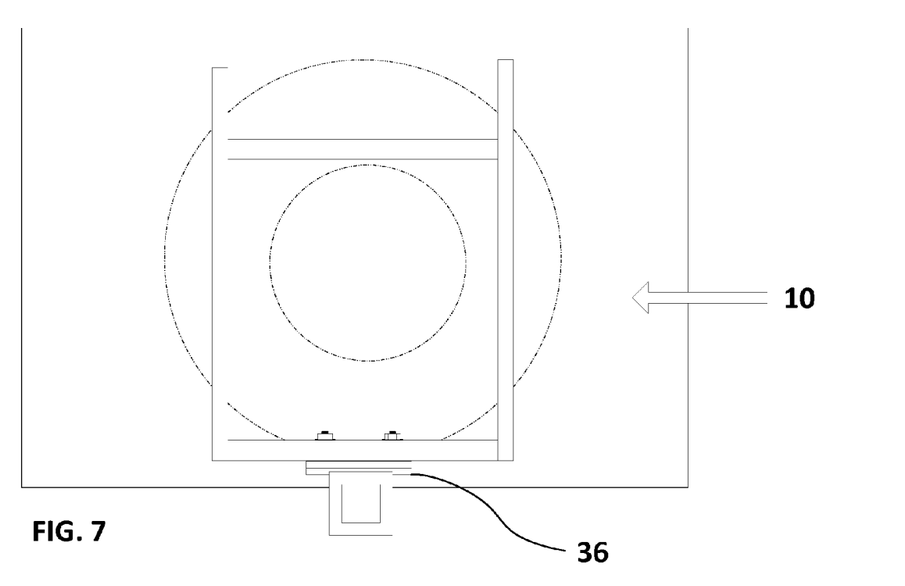
FIG. 7 is front view of one embodiment of the spare tire carrier with the hinged bracket in the upright position.
Figure 8:
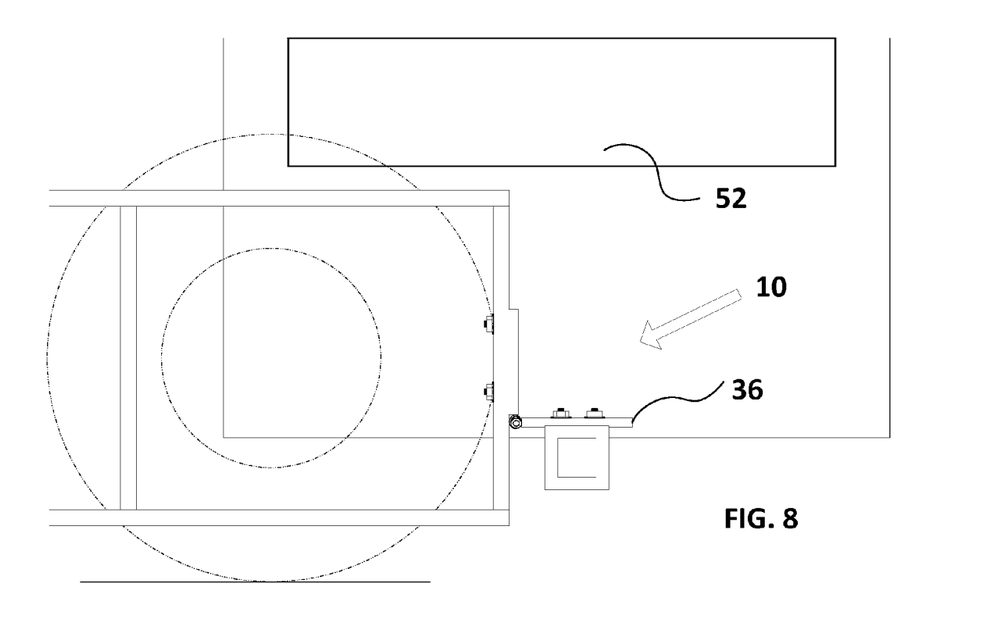
FIG. 8 is front view of one embodiment of the spare tire carrier with the hinged bracket in the down position.

FIGS. 7 and 8 depict another embodiment of the spare tire carrier 10, wherein the mounting assembly includes a hinged bracket 36. Specifically, FIG. 7 illustrates the spare tire carrier 10 with the hinged bracket 36 in an upright position and FIG. 8 illustrates the spare tire carrier 10 with the hinged bracket 36 in a down position. Generally, when a spare tire is being carried by the spare tire carrier 10 the hinged bracket 36 will be in the carry position, which holds the tire in an upright position. This position is similar to the position illustrated in FIGS. 1-6. However, it may be difficult to access the back compartment for some vehicles. For example, large Class A diesel RVs typically have a rear access door 52 for the driver to check fluids and access engine components.

Furthermore, the down position may be utilized for loading and unloading the tire. For example, some people may be unable to physically lift the tire and align the tire such that it can be received in the close-fitting "tire sized" space between the support members of the support assembly. Thus, as depicted in FIG. 7, the spare tire carrier 10 with hinged bracket 36 may be positioned in the down position to assist with loading and unloading. In the illustrated embodiment, while in the down position, the support assembly is positioned in a lateral position, which allows the tire to be rolled in and out of the support assembly. Thereafter, the support assembly and tire are lifted together into the upright or carry position.

Figure 9:
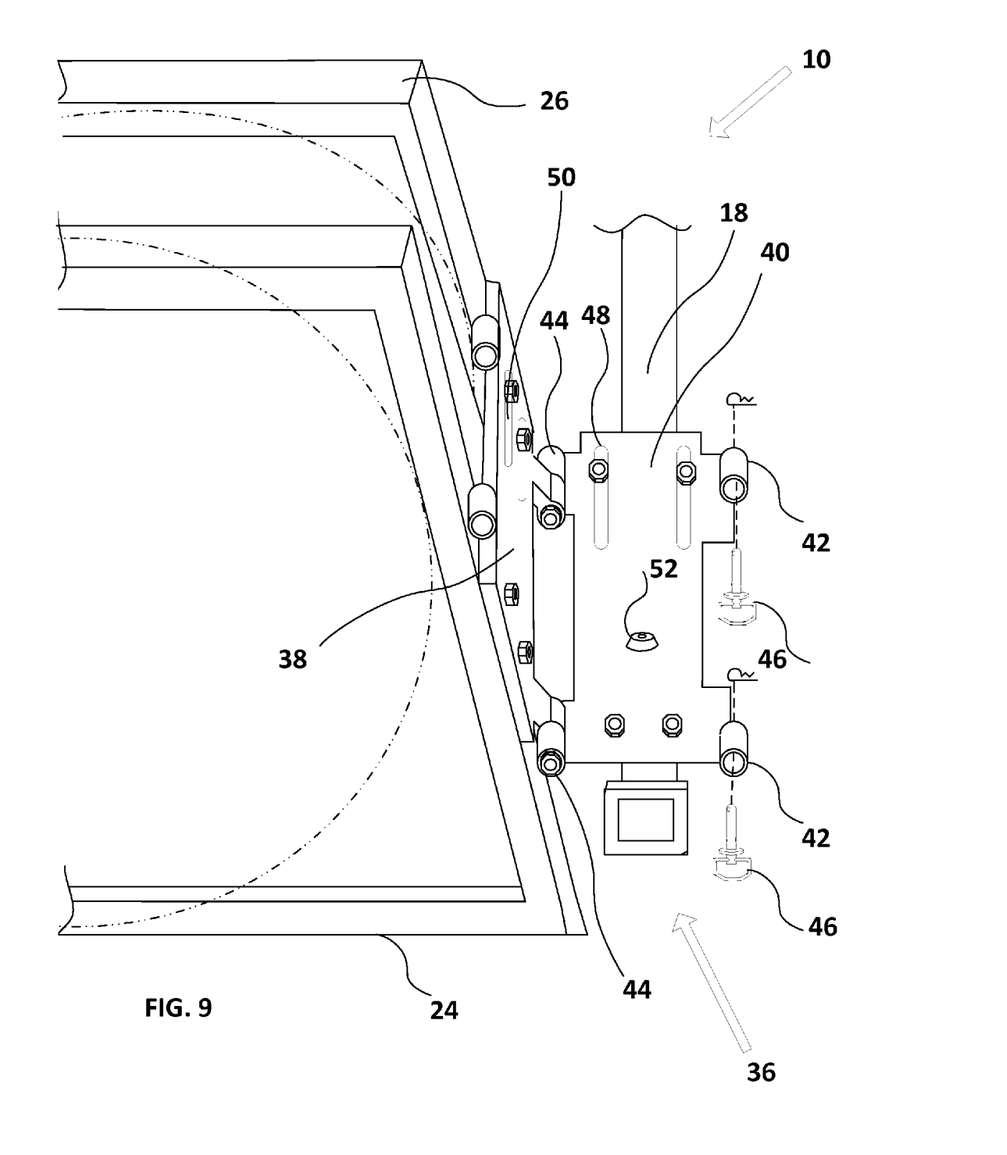
FIG. 9 is a perspective view of one embodiment of the spare tire carrier with the hinged bracket.

FIG. 9 depicts another embodiment of the spare tire carrier 10, wherein the mounting assembly includes a hinged bracket 36. Specifically, FIG. 9 illustrates the spare tire carrier 10 with the hinged bracket 36 in a down position.

In the illustrated embodiment, the hinged bracket 36 includes a top plate 38 and a bottom plate 40. Each of the top and bottom plates 38, 40 includes four cylinder hinge connectors 42, 44 at the corners. Opposing cylinder hinge connectors 44 on one side of each of the top plate 38 and the bottom plate 40 are connected to form a hinged axis for the hinged bracket 36. Further, the opposite side cylinder hinge connectors 42 are arranged such that removable pins 46 secure the hinged bracket 36 in a locked upright/carry position.

Further, in the illustrated embodiment, the hinged bracket 36 is mounted to the elongated member 18 of the mounting assembly. In the illustrated embodiment, the bottom plate 40 is secured to the elongated member 18 via U-bolts. It should also be noted that the bottom plate 40 includes elongated openings 48 that allow for variable placement of the bottom plate 40 on the elongated member 18. Further, the top plate 38 includes similar elongated openings 50 for securing the back support member 26. The elongated opening 50 allows the back support member 26 to be selectively positioned for the tire size. For example, for a small width tire the back support member 26 may be positioned closer to the front support member 24. In another example, for a larger width tire, the back support member 26 may be positioned further away from the front support member 24.

Furthermore, in one embodiment, the hinged bracket 36 includes a rubber stopper 52 to stop the bottom plate 40 and the top plate 42 at a position for receiving the removable pins 46. Further the rubber stopper 52 inhibits or reduces the bottom plate 40 and the top plate 42 from vibrations during transit of the spare tire.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:
1. A spare tire carrier comprising:
a mounting assembly to connect to a motor vehicle, the mounting assembly having a first end dimensioned to be received within a hitch receiver and a second end dimensioned to receive a towing hitch for towing a vehicle;
a support assembly for holding a tire; and a hinged bracket mounting the support assembly to the mounting assembly, the hinged bracket having a first position to carry the tire in an upright position and pivoting laterally to a second position that does not interfere with the towing hitch;

wherein the support assembly further comprises a first support member and a second support member, the first support member being mounted to the mounting assembly at a first position, the second support member mounted to the mounting assembly at a second position, the first support member and the second support member being at a spaced relationship for receiving the tire therebetween;

wherein the support assembly further comprises an attachment bracket configured to be releasably coupled to the first support member and the second support member such that the attachment bracket is proximate a portion of the tire, whereby the attachment bracket constricts the spaced relationship between the first support member and the second support member to secure the tire therebetween;

wherein the support assembly further comprises a support strap releaseably connected to the attachment bracket and extending around the tire to further secure the tire to the spare tire carrier.

2. The spare tire carrier of claim 1, wherein the mounting assembly includes an elongated member having the first end dimensioned to be received within the hitch receiver.

3. The spare tire carrier of claim 2, wherein the elongated member includes the second end dimensioned to receive a towing hitch.

4. The spare tire carrier of claim 3, wherein the hinged bracket provides a surface for supporting the tire.

5. The spare tire carrier of claim 4, wherein the hinged bracket is selectively mounted to the elongated member to allow the hinged bracket to be mounted at a selectable distance from the first end of the elongated member, whereby a distance between the motor vehicle and the tire can be adjusted.

6. The spare tire carrier of claim 1, wherein the tire is rimless.

7. The spare tire carrier of claim 1, wherein the support assembly holds the tire without securing to a rim of the tire.

8. The spare tire carrier of claim 1, wherein the hinged bracket includes removable pins to lock the hinged bracket in the first position, the pins being selectively removeable to unlock the hinged bracket before moving to the second position.

* * * * *